(12) United States Patent
Cheung et al.

(10) Patent No.: US 7,313,197 B2
(45) Date of Patent: Dec. 25, 2007

(54) DATA TRANSCEIVER AND METHOD FOR TRANSCEIVING DATA PERFORMING EQUALIZATION AND PRE-EMPHASIS ADAPTIVE TO TRANSMISSION CHARACTERISTICS OF RECEIVING PART

(75) Inventors: Tae Sik Cheung, Daejeon (KR); Jae Wook Lee, Kyungki-do (KR); Woo Young Choi, Seoul (KR); Bhum Cheol Lee, Daejeon (KR); Bong Tae Kim, Daejeon (KR); Jong Hyun Lee, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 674 days.

(21) Appl. No.: 10/855,258

(22) Filed: May 26, 2004

(65) Prior Publication Data

US 2005/0105641 A1   May 19, 2005

(30) Foreign Application Priority Data

Nov. 19, 2003   (KR) ...................... 10-2003-0082348

(51) Int. Cl.
*H04L 25/49* (2006.01)
(52) U.S. Cl. .................................................. 375/296
(58) Field of Classification Search ........ 375/295–296, 375/222, 257; 455/63.1, 67.11, 114.2, 114.3
See application file for complete search history.

(56) References Cited

U.S. PATENT DOCUMENTS

| 4,969,162 | A | * | 11/1990 | Karr ........................... 375/230 |
| 5,659,581 | A | * | 8/1997 | Betts et al. ................. 375/296 |
| 6,212,229 | B1 | | 4/2001 | Salinger |
| 6,570,406 | B2 | | 5/2003 | Tang et al. |
| 2004/0047409 | A1 | * | 3/2004 | Lee et al. .................... 375/232 |

OTHER PUBLICATIONS

Yoshiharu Kodoh et al., "A 0.13-um CMOS 5-Gb/s 10-m 28 AWG Cable Transceiver With No-Feedback . . . Post-Equalizer"; IEEE Journal of Solid-Sttate Circuits, vol. 38, No. 5, May 2003 (pp. 741-746).

\* cited by examiner

*Primary Examiner*—Khanh C. Tran
(74) *Attorney, Agent, or Firm*—Blakely, Sokoloff, Taylor & Zafman (57) ABSTRACT

Provided are a data transceiver and method for performing equalization and pre-emphasis adaptive to the transmission characteristic of a transmitting part. The transceiver measures the signal attenuation characteristic of a transmission line of a receiving part using an input data signal input via the transmission line of the receiving part, decodes the distorted waveform of the input data signal, distorts the waveform of an output data signal beforehand using the measured signal attenuation characteristic of the transmission line of the receiving part, and transmits the output data signal via a transmission line of a transmitting part. Thus, when the output data signal is transmitted via the transmission line of the transmitting part, the waveform of the signal remains optimized.

9 Claims, 5 Drawing Sheets

DATA TRANSCEIVER AND METHOD FOR TRANSCEIVING DATA PERFORMING EQUALIZATION AND PRE-EMPHASIS ADAPTIVE TO TRANSMISSION CHARACTERISTICS OF RECEIVING PART

BACKGROUND OF THE INVENTION

This application claims the priority of Korean Patent Application No. 2003-82348, filed on Nov. 19, 2003, in the Korean Intellectual Property Office, the disclosure of which is incorporated herein in its entirety by reference.

1. Field of the Invention

The present invention relates to a data transceiver and method, and more particularly, a data transceiver and method for transceiving data performing equalization and pre-emphasis adaptive to transmission characteristics of a receiving part.

2. Description of the Related Art

A square wave transmission signal, such as a binary data signal, which includes both high-frequency components and low-frequency components, is widely used in wired digital communications. While the square wave transmission signal is passing through a transmission line, the high-frequency components are attenuated more than the low-frequency components, thus resulting in signal distortion. Thus, a timing margin required for perceiving input data without errors at a receiving terminal is reduced.

To solve this problem, an equalization method and a pre-emphasis method have been proposed. In the equalization method, the distorted waveform of a data signal is decoded at a receiving terminal. In the pre-emphasis method, the waveform of an input data signal is distorted at a transmitting terminal beforehand in consideration of a signal attenuation characteristic of a transmission line of a receiving part, so that the waveform of an output data signal remains optimized at a receiving terminal.

However, in these methods, if the equalization function of the receiving terminal and a parameter required for pre-emphasis at the transmitting terminal are controlled by external controllers, since the transmitting or receiving terminal should be controlled after manually measuring the signal attenuation characteristic of the transmission line, the efficiency is low. And the signal attenuation characteristic of the transmission line cannot be precisely measured with the transmitting and receiving terminal connected to the each side of the transmission line.

On the other hand, an equalization parameter may be automatically controlled through feedback operations at a receiving terminal, or a pre-emphasis parameter may be automatically controlled at a transmitting terminal by two transceivers that are disposed one at either end of a transmission line, perform the same functions, and transmit and receive test signals based on predefined rules. In these methods, the foregoing problems can be solved, but each transceiver should include additional devices that perform the automatic control functions. Thus, if a multiple link system comprised of a plurality of transceiving apparatuses is required, power consumption and cost are high. Also, pairs of transceivers should have the same functions.

Further, in conventional data transceiving methods, an equalization parameter or a pre-emphasis parameter, which is required to compensate for the signal attenuation characteristic of a transmission line, should be set in an initial operation of a transceiver. For this reason, the conventional methods should further include compensation functions for factors such as changes in temperature or characteristics of input and output buffers of transceiving terminals, which may affect the signal attenuation characteristic of the transmission line during operation of the transceiver.

SUMMARY OF THE INVENTION

The present invention provides a data transceiver, which automatically controls an equalization parameter of a receiving terminal by continuously measuring a signal attenuation characteristic of a transmission line of a receiving part using an input data signal, while automatically controlling a pre-emphasis parameter of a transmitting terminal using the equalization parameter.

The present invention also provides a data transceiver and method, which measure the signal attenuation characteristic of a transmission line of a receiving part by continuously measuring the distortion of a data signal input to a receiving terminal, instead of using a test signal in an initial operation. Thus, an equalization parameter and a pre-emphasis parameter of the data transceiver can be controlled by reflecting a change in the characteristic of the transmission line during real-time operation.

The present invention further provides a data transceiver and method, which improve the performance of a multiple link system that operates a plurality of transmission lines with similar signal attenuation characteristics by controlling equalization parameters and pre-emphasis parameters of remaining transceivers using an equalization parameter obtained from one receiving apparatus.

According to an aspect of the present invention, there is provided a data transceiver comprising a data receiving unit including an equalizer that receives an input data signal from a transmitter via a transmission line of a receiving part, generates an equalization parameter corresponding to electrical characteristics of the transmission line to the receiving part, and decodes a distorted waveform of the input data signal using the equalization parameter; a converter, which generates a pre-emphasis parameter corresponding to the equalization parameter; and a data transmitting unit including a pre-emphasis circuit that receives the pre-emphasis parameter from the converter, distorts a waveform of the data signal, and transmits an output data signal to a receiver via a transmission line of a transmitting part According to another aspect of the present invention, there is provided a multiple link system in which a plurality of data transceiving apparatuses are connected to one another, the system comprising a first data transceiving unit, which generates an equalization parameter corresponding to electrical characteristics of a first transmission line of a receiving part, decodes a distorted waveform of an input data signal input from a first transmitter via the first transmission line of the receiving part, generates a pre-emphasis parameter corresponding to the equalization parameter, distorts the waveform of an output data signal, transmits the output data signal to a first receiver via a first transmission line of a transmitting part; and a plurality of second data transceiving units, each of which receives the equalization parameter from the first data transceiving unit, decodes a distorted input data signal input from a second transmitter via a second transmission line of a receiving part, receives the pre-emphasis parameter from the first data transceiving unit, distorts the waveform of an output data signal, and transmits the output data signal to a second receiver via a second transmission line of a transmitting part.

According to yet another aspect of the present invention, there is provided a data transceiving method comprising: receiving input data from a transmitter via a transmission line of a receiving part, and measuring electrical characteristics of the transmission line of the receiving part in real-time; generating an equalization parameter corresponding to the electrical characteristics of the transmission line of the receiving part, and decoding a distorted waveform of the input data; generating a pre-emphasis parameter corresponding to the equalization parameter; and distorting the waveform of output data according to the control of the pre-emphasis parameter, and transmitting the output data to a receiver via a transmission line of a transmitting part.

According to still another aspect of the present invention, there is provided a data transceiving method using a multiple link system in which a plurality of data transceiving apparatuses are connected to one another, the method comprising (a) at least one data transceiving unit receiving input data from a transmitter via a transmission line of a receiving part, and measuring electrical characteristics of the transmission line of the receiving part in real-time; (b) the at least one data transceiving unit generating an equalization parameter corresponding to the electrical characteristics of the transmission line of the receiving part, and decoding the distorted waveform of the input data; (c) the at least one data transceiving unit generating a pre-emphasis parameter corresponding to the equalization parameter; (d) the at least one data transceiving unit distorting the waveform of output data according to the control of the pre-emphasis parameter, and transmitting the output data to a first receiver via a first transmission line of a transmitting part; (e) each of the remaining data transceiving units decoding the distorted waveform of input data using the equalization parameter generated in step (b); and (f) each of the remaining data transceiving units distorting the waveform of output data using the pre-emphasis parameter generated in step (c) and transmitting the output data to a second receiver via a second transmission line of a transmitting part.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
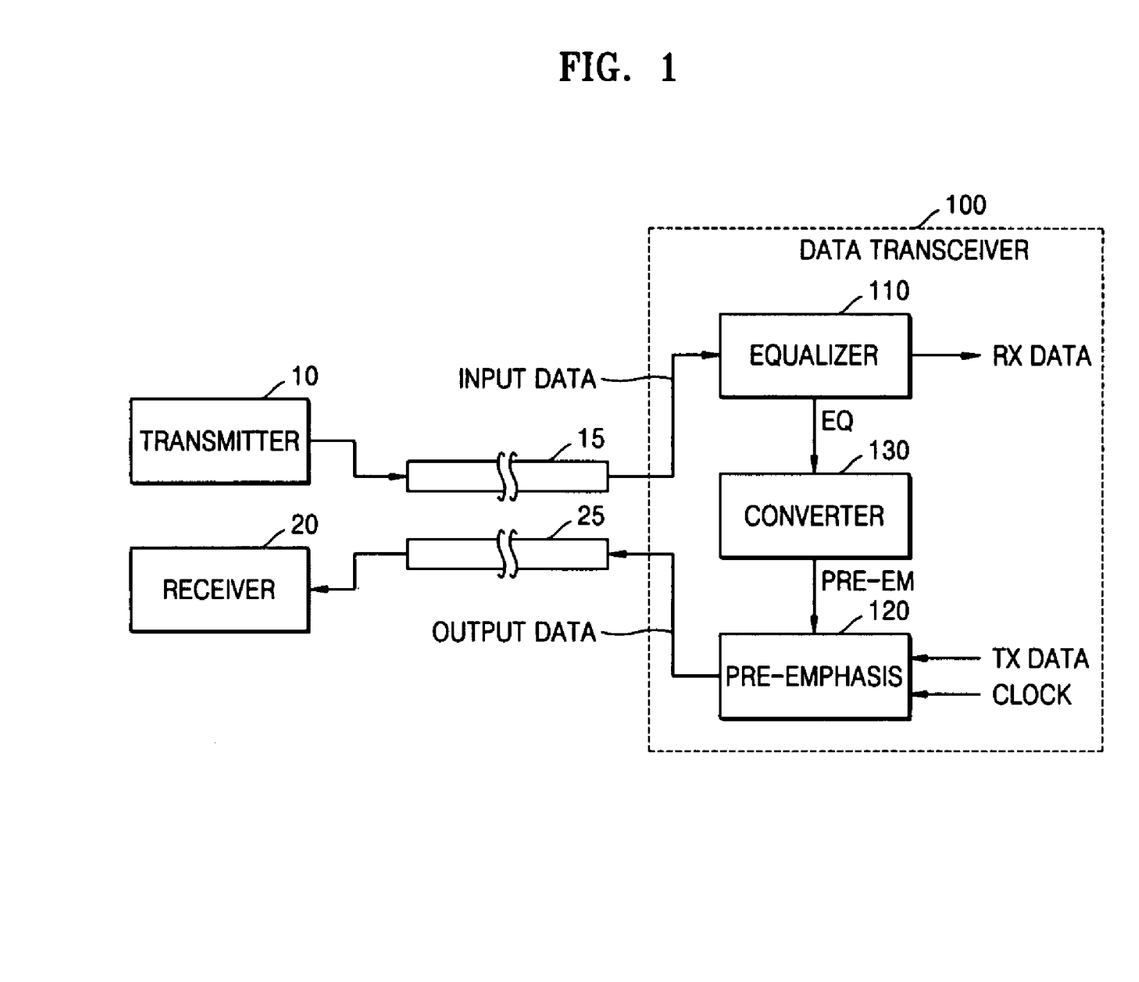
FIG. 1 is a circuit diagram of a data transceiver according to the present invention.

FIG. 1 is a circuit diagram of a data transceiver 100 according to the present invention. Referring to FIG. 1, the data transceiver 100 comprises a data receiving unit including an equalizer 110, a data transmitting unit including a pre-emphasis circuit 120, and a converter 130.

The equalizer 110 receives an input data signal INPUT DATA via a transmission line 15, from a transmitter 10 disposed at one end of the transmission line 15, and measures electrical characteristics of the transmission line 15 in real-time. Also, the equalizer 110 decodes the distorted waveform of the input data signal INPUT DATA using an equalization parameter EQ corresponding to the electrical characteristics of the transmission line 15, and, at the same time, outputs the equalization parameter EQ used for decoding the INPUT DATA.

The converter 130, which is connected between the equalizer 110 and the pre-emphasis circuit 120, receives the equalization parameter EQ from the equalizer 110 and generates a pre-emphasis parameter PRE-EM corresponding to the equalization parameter EQ.

The pre-emphasis circuit 120 receives the pre-emphasis parameter PRE-EM from the converter 130, distorts the waveform of an output data signal OUTPUT DATA with a predetermined amount by the control of the pre-emphasis parameter PRE-EM, and then outputs the output data signal OUTPUT DATA to a receiver 20. Thus, when the data signal OUTPUT DATA is transmitted via a transmission line 25 back to the receiver 20, the waveform of the data signal OUTPUT DATA remains optimized.

Figure 2:
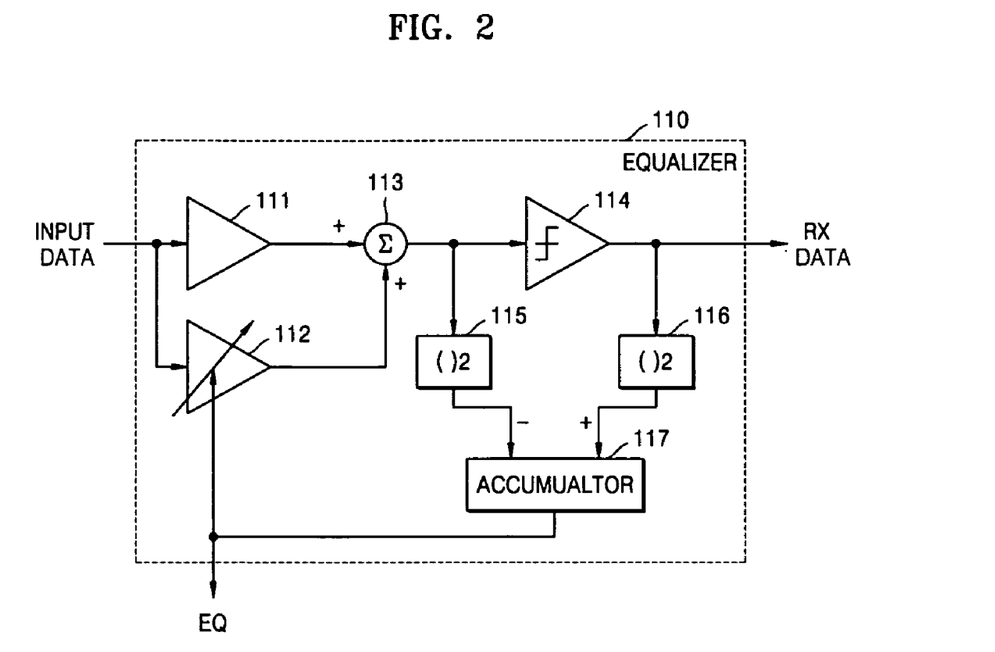
FIG. 2 is a circuit diagram of an equalizer shown in FIG. 1.

FIG. 2 is a circuit diagram of the equalizer 110 shown in FIG. 1. Referring to FIG. 2, the equalizer 110 includes an amplifier 111, a variable gain amplifier 112, an adder 113, a limiter 114, first and second squaring units 115 and 116, and an accumulator 117.

The amplifier 111 amplifies the waveform of an input data signal INPUT DATA. The variable gain amplifier 112 extracts high-frequency components from the data signal INPUT DATA and variably amplifies the extracted high-frequency components with a predetermined amount by the control of the equalization parameter EQ. Here, the equalization parameter EQ is a ratio of the amplification of the high-frequency components to low-frequency components. By continuously measuring the signal attenuation characteristic of the transmission line 15, the equalization parameter EQ is automatically controlled through feedback operations such that the waveform of the decoded data signal is optimized.

The adder 113 adds an output signal of the amplifier 111 to an output signal of the variable gain amplifier 112 and outputs a signal obtained by reinforcing the data signal INPUT DATA with the high-frequency components. The limiter 114 amplifies the output signal of the adder 113 with a very high gain and holds the amplitude of an output signal RX DATA constant by limiting the amplitude of the output signal RX DATA.

The first and second squaring units 115 and 116 square the input signal and the output signal of the limiter 114 and measure the amplitudes of the input and output signals of the limiter 114, respectively. The accumulator 117 receives information on the amplitudes of the input and output signals of the limiter 114 from first and second squaring units 115 and 116, accumulates a difference therebetween, and outputs the result as the equalization parameter EQ.

In the equalizer 110 shown in FIG. 2, if the amplitude of the input signal of the limiter 114 is less than the amplitude of its output signal, the level of the equalization parameter EQ that is output by the accumulator 117 increases. Then, the gain of the variable gain amplifier 112 increases in proportion to the level of the equalization parameter EQ, and the output signal of the adder 113 is further reinforced with the high-frequency components. Thus, the difference between the amplitudes of the input and output signals of the limiter 114 decreases.

If the amplitude of the input signal of the limiter 114 is greater than that of the output signal thereof, the level of the equalization parameter EQ decreases, and thus the gain of the variable gain amplifier 112 decreases. As a result, the output signal of the adder 113 is less reinforced with the high-frequency components as compared with the input data signal. Thus, the difference between the amplitudes of the input and output signals of the limiter 114 decreases.

Through the foregoing negative feedback operations, the equalizer 110 causes the level of the equalization parameter EQ to converge on an optimum value according to the amount of distortion of the input data signal, and decodes the distorted waveform of the input data signal. Accordingly, the level of the equalization parameter EQ reflects the signal attenuation characteristic of the transmission line. That is, as the attenuation of the signal in the transmission line increases, the level of the equalization parameter EQ increases, and as the attenuation of the signal in the transmission line decreases, the level of the equalization parameter EQ decreases. Here, the level of the equalization parameter EQ can be expressed as a variable value, such as an analog voltage, a current, or a logic value comprised of a plurality of bits, according to the construction of the accumulator 117 and a gain control type of the variable gain amplifier 112.

Figure 3:
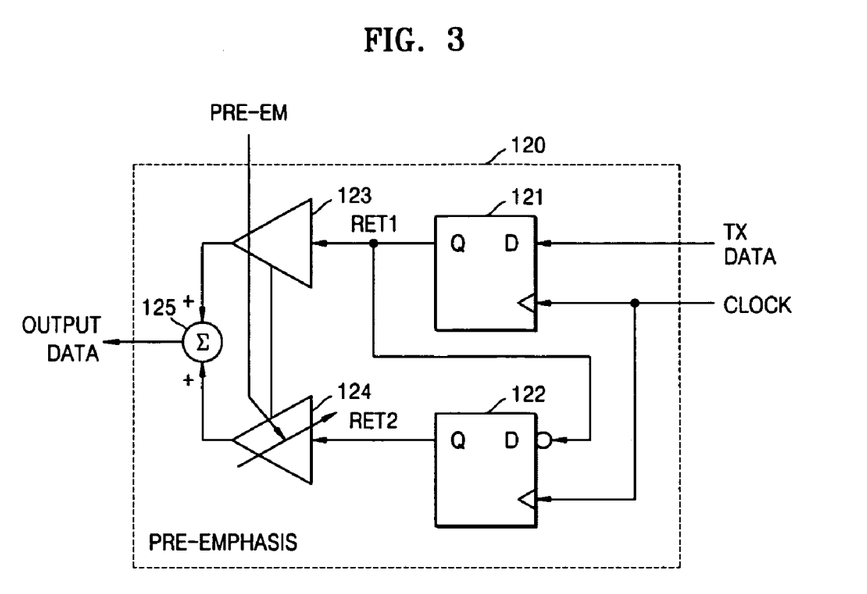
FIG. 3 is a circuit diagram of a pre-emphasis circuit shown in FIG. 1.

FIG. 3 is a circuit diagram of the pre-emphasis circuit 120 shown in FIG. 1. Referring to FIGS. 1 and 3, the pre-emphasis circuit 120 includes a first D flip-flop 121, a second D flip-flop 122, an amplifier 123, a variable gain amplifier 124, and an adder 125.

The first D flip-flop 121 receives a data signal TX DATA and a clock signal CLOCK synchronized with the data signal TX DATA, retimes the data signal TX DATA, and generates a first retiming signal RET1. The second D flip-flop 122 receives the first retiming signal RET1 output from the first D flip-flop signal 121 and the clock signal CLOCK synchronized with the first retiming signal RET1, retimes an inverted signal of the first retiming signal RET1, and generates a second retiming signal RET2.

The amplifier 123 receives the first retiming signal RET1 from the first D flip-flop 121, amplifies the first retiming signal RET1 with a predetermined gain, and outputs the amplified signal. The variable gain amplifier 124 receives the second retiming signal RET2 from the second D flip-flop 122, variably amplifies the second retiming signal RET2 with a predetermined amount according to the pre-emphasis parameter PRE-EM, and outputs the amplified signal. The adder 125 adds the output of the amplifier 123 to the output of the variable gain amplifier 124 and transmits the resulting signal to the receiver 20 via the transmission line 25.

In the pre-emphasis circuit 120 shown in FIG. 3, the first and second D flip-flops 121 and 122 sequentially retime the data signal TX DATA using the clock signals CLOCK synchronized with the data signal TX DATA. The first retiming signal RET1 becomes a data signal TX DATA to be presently output, and the second retiming signal RET2 becomes an inverted version of the data signal TX DATA that was output just one clock before.

When the logic value of the data signal to be presently output differs from that of the data signal output just before, and thus the output signal makes an upward or downward transition and contains high-frequency components, i.e., when the logic value of the first retiming signal RET1 is equal to that of the second retiming signal RET2, the output of the amplifier 123 is added to the output of the variable gain amplifier 124, thus increasing the amplitude of the data signal.

On the other hand, when the logic value of the data signal to be presently output is equal to the amplitude of the data signal just output, and thus the output signal makes no upward or downward transition and contains no high-frequency component, i.e., when the logic value of the first retiming signal RET1 differs from that of the second retiming signal RET2, the outputs of the amplifier 123 and the variable gain amplifier 124 counterbalance each other, thus decreasing the amplitude of the data signal.

For example, if the gain of the amplifier 123 is 1 and the gain of the variable gain amplifier 124 is controlled by the pre-emphasis parameter PRE-EM and set to 0.25, when a data signal TX DATA to be output is sequentially input as binary data '000100111' to the pre-emphasis circuit 120, the output levels of respective binary bits are controlled as shown in Table 1.

TABLE 1

| | Output levels of respective binary bits | | | | | | | | |
|---|---|---|---|---|---|---|---|---|---|
| Output bits | 0 | 0 | 0 | 1 | 0 | 0 | 1 | 1 | 1 |
| Transition | X | X | X | ○ | ○ | X | ○ | X | X |
| Output levels | 0.75 | 0.75 | 0.75 | 1.25 | 1.25 | 0.75 | 1.25 | 0.75 | 0.75 |

By the operation of the pre-emphasis circuit 120, the waveform of the output signal OUTPUT DATA is distorted beforehand such that when the output signal OUTPUT DATA reaches the receiver 20 via the transmission line 25, the waveform of the output signal OUTPUT DATA is optimized. Here, the distortion of the output waveform is controlled by the level of the pre-emphasis parameter PRE-EM that is generated from the equalization parameter EQ, and a proportional relationship between the distortion and the level of the pre-emphasis parameter PRE-EM or a method of expressing the level of the pre-emphasis parameter EQ varies according to the gain control type of the variable gain amplifier 124.

The equalization parameter EQ and the pre-emphasis parameter PRE-EM can be expressed in different formats according to the types of devices for generating or using the parameters. For this reason, to generate the pre-emphasis parameter PRE-EM from the equalization parameter EQ, an additional converter 130 shown in FIG. 1 is required.

If the equalization parameter EQ and the pre-emphasis parameter PRE-EM have the same property and range, for example, if both EQ and PRE-EM are expressed as analog voltages and have the same voltage range and a proportional relationship, the converter 130 can be omitted. However, if the equalization parameter EQ and the pre-emphasis parameter PRE-EM have different properties and ranges, the converter 130 can be simply formed using circuits such as a voltage-to-current converter, a current-to-voltage converter, an amplifier, an attenuator, a level shifter, and a digital-to-analog converter (DAC) or an analog-to-digital converter (ADC).

Figure 4:
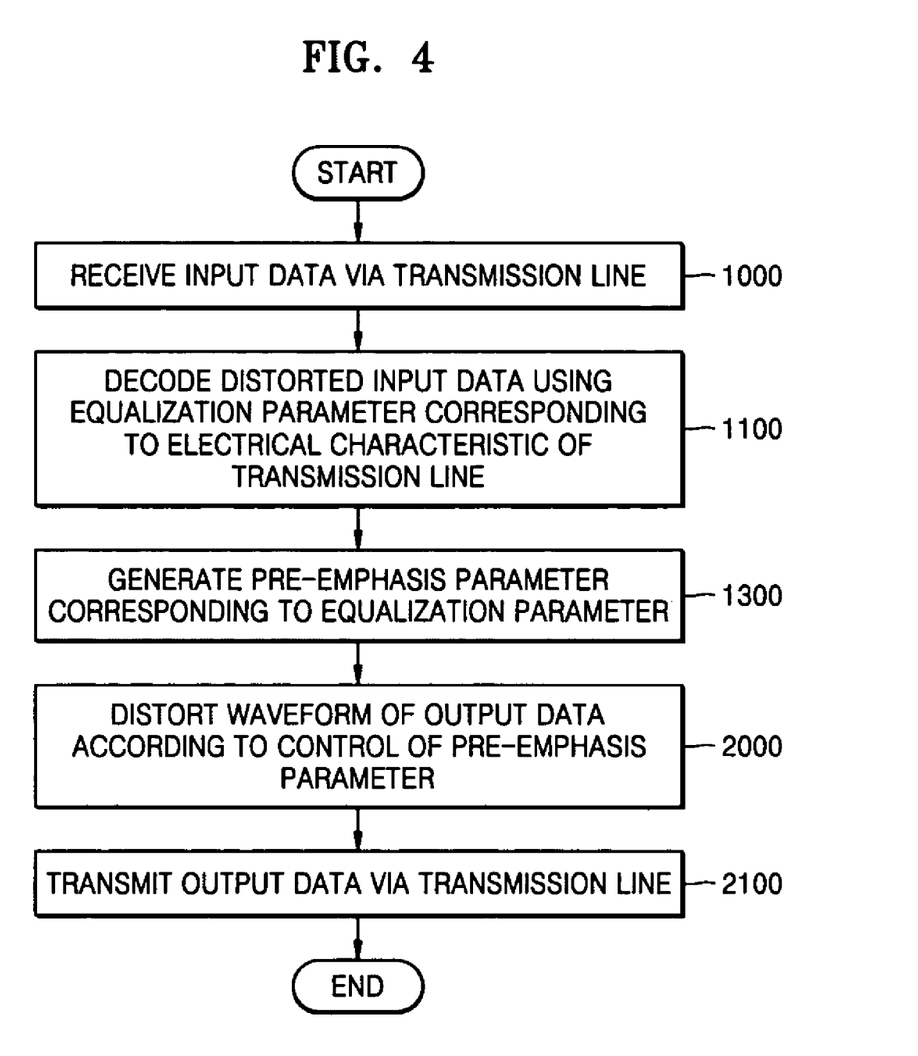
FIG. 4 is a flowchart illustrating a data transceiving method according to the present invention.

FIG. 4 is a flowchart illustrating a data transceiving method according to the present invention. Referring to FIGS. 1 through 4, the equalizer 110 receives input data INPUT DATA via the transmission line 15 from the transmitter 10, measures the electrical characteristics of the transmission line 15 in real-time, and generates an equalization parameter EQ corresponding to the electrical characteristics of the transmission line 15 in step 1000. In step 1100, the equalizer 110 decodes the distorted waveform of the input data INPUT DATA using the equalization parameter EQ. Thereafter, the converter 130 generates a pre-emphasis parameter PRE-EM corresponding to the equalization parameter EQ in step 1300.

In step 2000, the pre-emphasis circuit 120 receives the pre-emphasis parameter PRE-EM from the converter 130 and distorts the waveform of output data OUTPUT DATA beforehand according to the control of the pre-emphasis parameter PRE-EM. In step 2100, the pre-emphasis circuit 120 transmits the distorted output data OUTPUT DATA via the transmission line 25 to the receiver 20.

As described above, in an interconnection transceiving system, the data transceiving method according to the present invention extracts the transmission characteristic of data that is input via a transmission line of a receiving part, compensates for the characteristic of the transmission line to the receiving part, and decodes the input data. Also, the transceiving method according to the present invention compensates for the characteristic of a transmission line of a transmitting part by applying the extracted transmission characteristic to a local transmitting unit so as to facilitate reception by a remote receiving unit. This data transceiving method can be applied to a multiple link system in which a plurality of transceiving systems are connected to one another. Such a multiple link system will now be described in detail with reference to FIG. 5.

Figure 5:
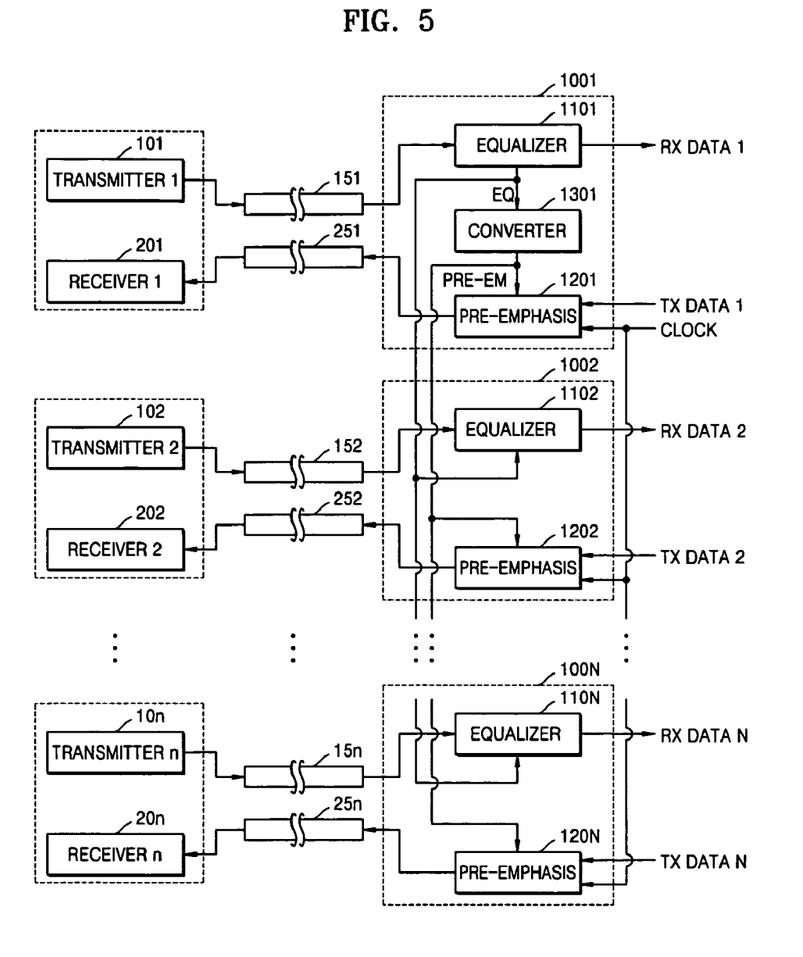
FIG. 5 is a circuit diagram of a multiple link system to which the data transceiver shown in FIG. 1 is applied.

FIG. 5 is a circuit diagram of a multiple link system to which the data transceiving apparatus shown in FIG. 1 is applied. Referring to FIG. 5, N data transceiving apparatuses 1001-100N are connected to N transmitters 101-10N and N receivers 201-20N, respectively, via 2N transmission lines 151, 251, . . . , 15N, and 25N. Here, the transmission lines 151, 251, . . . , 15N, and 25N have similar electrical characteristics, and the transmitters 101-10N and the receivers 201-20N have the same structure.

A first data transceiver 1001 has the same structure as the data transceiver 100 shown in FIG. 1, an equalizer 1101 included in the first data transceiving apparatus 1001 has the same structure as the equalizer shown in FIG. 2, and a pre-emphasis circuit 1201 included in the first data transceiving apparatus 1001 has the same structure as the pre-emphasis circuit shown in FIG. 3.

Also, second through Nth data transceivers 1002-100N have equalizers 1102-110N and pre-emphasis circuits 1202-120N, respectively. The second through Nth data transceivers 1002-100N share and use an equalization parameter EQ and a pre-emphasis parameter PRE-EM, which are generated from the first data transceiver 1001. Thus, to simplify the circuit construction, the second through Nth data transceivers 1002-100N include no additional circuits for generating an equalization parameter EQ and a pre-emphasis parameter PRE-EM.

To this end, each of the second through Nth data transceivers 1002-100N include only the amplifier 111, the variable gain amplifier 112, and the adder 113 of the equalizer 110 shown in FIG. 2, but does not include the limiter 114, the first and second squaring units 115 and 116, and the accumulator 117, which are required to generate the equalization parameter EQ. Also, the second through Nth data transceivers 1002-100N do not include the converter 130 that is required to generate the pre-emphasis parameter PRE-EM. Each of the pre-emphasis circuits 1202-120N, which distorts an output signal OUTPUT DATA according to the control of the pre-emphasis parameter PRE-EM, has the same structure as the pre-emphasis circuit 120 shown in FIG. 3.

In the foregoing multiple link system, since the second through Nth data transceivers 1002-100N share and use the equalization parameter EQ and the pre-emphasis parameter PRE-EM, which are generated by the first data transceiver 1001, the equalizers 1102-110N can have a simple structure without devices for generating the equalization parameter EQ. As a result, the area occupied by transmitting and receiving terminals of the data transceivers as well as the power consumption can be greatly reduced. Also, the equalization parameters EQ and the pre-emphasis parameters PRE-EM of the remaining data transceivers can be controlled using the equalization parameter EQ obtained from one data transceiver, thus effectively maximizing the performance of the plurality of data transceivers.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A data transceiver comprising:
a data receiving unit including an equalizer that receives an input data signal from a transmitter via a transmission line of a receiving part, generates an equalization parameter corresponding to electrical characteristics of the transmission line to the receiving part, and decodes a distorted waveform of the input data signal using the equalization parameter; and
a data transmitting unit including a pre-emphasis circuit that generates the pre-emphasis parameter corresponding to the equalization parameter, distorts a waveform of the data signal, and transmits an output data signal to a receiver via a transmission line of a transmitting part, wherein the equalizer includes an accumulator, which receives information on amplitudes of input and output signals of a limiter from first and second devices for performing square operations, accumulates a difference therebetween, and outputs a result as the equalization parameter.

2. The apparatus of claim 1, wherein the equalizer comprises:
a first amplifier, which amplifies the waveform of the input data signal;
a first variable gain amplifier, which extracts a predetermined number of high-frequency components of the input data signal and variably amplifies the extracted high-frequency components under the control of the equalization parameter;
a first adder, which adds an output signal of the first amplifier to an output signal of the first variable gain amplifier and outputs a signal obtained by reinforcing the data signal with the high-frequency components;
a limiter, which amplifies the output of the first adder with a very high gain and holds the amplitude of an output signal of the limiter constant by limiting the greatest amplitude of the output signal of the limiter; and first and second squaring units, which are connected to input and output terminals of the limiter and square the input and output signals of the limiter, respectively.

3. The apparatus of claim 1, wherein the pre-emphasis circuit comprises:
a first D flip-flop, which receives a data signal to be output and a clock signal synchronized with the data signal, retimes the data signal, and generates a first retiming signal;
a second D flip-flop, which receives the first retiming signal output from the first D flip-flop and the clock signal synchronized with the first retiming signal, retimes an inverted signal of the first retiming signal, and generates a second retiming signal;
a second amplifier, which receives the first retiming signal from the first D flip-flop, amplifies the first retiming signal with a predetermined gain, and outputs the amplified signal;
a second variable gain amplifier, which receives the second retiming signal from the second D flip-flop, variably amplifies the second retiming signal with a predetermined amount according to the control of the pre-emphasis parameter, and outputs the amplified signal; and
a second adder, which adds the output of the amplifier to the output of the variable gain amplifier and transmits the result via the transmission line of the transmitting part to the receiver.

4. A data transceiver comprising:
a data receiving unit including an equalizer that receives an input data signal from a transmitter via a transmission line of a receiving part, generates an equalization parameter corresponding to electrical characteristics of the transmission line to the receiving part, and decodes a distorted waveform of the input data signal using the equalization parameter;
a converter, which generates a pre-emphasis parameter corresponding to the equalization parameter; and
a data transmitting unit including a pre-emphasis circuit that receives the pre-emphasis parameter from the converter, distorts a waveform of the data signal, and transmits an output data signal to a receiver via a transmission line of a transmitting part,
wherein the equalizer includes an accumulator, which receives information on amplitudes of input and output signals of a limiter from first and second devices for performing square operations, accumulates a difference therebetween, and outputs a result as the equalization parameter.

5. A multiple link system in which a plurality of data transceiving apparatuses are connected to one another, the system comprising:
a first data transceiving unit, which generates an equalization parameter corresponding to electrical characteristics of a first transmission line of a receiving part, decodes a distorted waveform of an input data signal input from a first transmitter via the first transmission line of the receiving part, generates a pre-emphasis parameter corresponding to the equalization parameter, distorts the waveform of an output data signal, transmits the output data signal to a first receiver via a first transmission line of a transmitting part; and
a plurality of second data transceiving units, each of which receives the equalization parameter from the first data transceiving unit, decodes a distorted input data signal input from a second transmitter via a second transmission line of a receiving part, receives the pre-emphasis parameter from the first data transceiving unit, distorts the waveform of an output data signal, and transmits the output data signal to a second receiver via a second transmission line of a transmitting part.

6. The system of claim 5, wherein the first data transceiving unit comprises:
a first equalizer, which measures the electrical characteristics of the first transmission line of the receiving part in real-time, generates the equalization parameter corresponding to the electrical characteristics of the first transmission line of the receiving part, and decodes the distorted waveform of an input data signal;
a converter, which generates a pre-emphasis parameter corresponding to the equalization parameter; and
a first pre-emphasis circuit, which receives the pre-emphasis parameter from the convener, distorts the waveform of an output data signal, and transmits the output data signal to the first receiver via the first transmission line of the transmitting part.

7. The system of claim 5, wherein each of the second data transceiving units comprises:
a second equalizer, which receives the equalization parameter from the first data transceiving unit and decodes the distorted waveform of an input data signal; and
a second pre-emphasis circuit, which receives the pre-emphasis parameter from the first data transceiving unit, distorts the waveform of an output data signal, and transmits the output data signal to the second receiver.

8. A data transceiving method comprising:
receiving input data from a transmitter via a first transmission line of a receiving part, and measuring electrical characteristics of the first transmission line of the receiving part in real-time;
generating an equalization parameter corresponding to the electrical characteristics of the first transmission line of the receiving part, and decoding a distorted waveform of the input data;
generating a pre-emphasis parameter corresponding to the equalization parameter; and
distorting the waveform of output data according to the control of the pre-emphasis parameter, and transmitting the output data to a receiver via a second transmission line of a transmitting part,
wherein the equalization parameter is generated by an equalizer which includes an accumulator, receiving information on amplitudes of input and output signals of a limiter from first and second devices for performing square operations, accumulates a difference therebetween, and outputs a result as the equalization parameter.

9. A data transceiving method using a multiple link system in which a plurality of data transceiving apparatuses are connected to one another, the method comprising:
(a) at least one data transceiving unit receiving input data from a transmitter via a transmission line of a receiving part, and measuring electrical characteristics of the transmission line of the receiving part in real-time;
(b) the at least one data transceiving unit generating an equalization parameter corresponding to the electrical characteristics of the transmission line of the receiving part, and decoding the distorted waveform of the input data;
(c) the at least one data transceiving unit generating a pre-emphasis parameter corresponding to the equalization parameter;

(d) the at least one data transceiving unit distorting the waveform of output data according to the control of the pre-emphasis parameter, and transmitting the output data to a first receiver via a first transmission line of a transmitting part;

(e) each of the remaining data transceiving units decoding the distorted waveform of input data using the equalization parameter generated in step (b); and (f) each of the remaining data transceiving units distorting the waveform of output data using the pre-emphasis parameter generated in step (c) and transmitting the output data to a second receiver via a second transmission line of a transmitting part.

* * * * *